United States Patent Office 3,526,124
Patented Sept. 1, 1970

3,526,124
APPARATUS FOR MEASURING THE BURNING RATE OF FUEL
Wolfgang J. Wostl, South Holland, Ill., assignor to Sinclair Research, Inc., New York, N.Y., a corporation of Delaware
Filed Nov. 29, 1967, Ser. No. 686,595
Int. Cl. G01n 33/22
U.S. Cl. 73—35    7 Claims

ABSTRACT OF THE DISCLOSURE

Apparatus for measuring the burning rate of fuel and automatically recording the rate. The electrical signal which is applied to the spark plug in a combustion chamber also starts the counting of oscillator pulses by a timer. When the flame has crossed the combustion chamber to reach an ionization gap, the counter is stopped and its output is read. The counter output can be applied to circuitry which, over a large number of tests, divides the flame propagation times into discrete groups.

Figure 1:
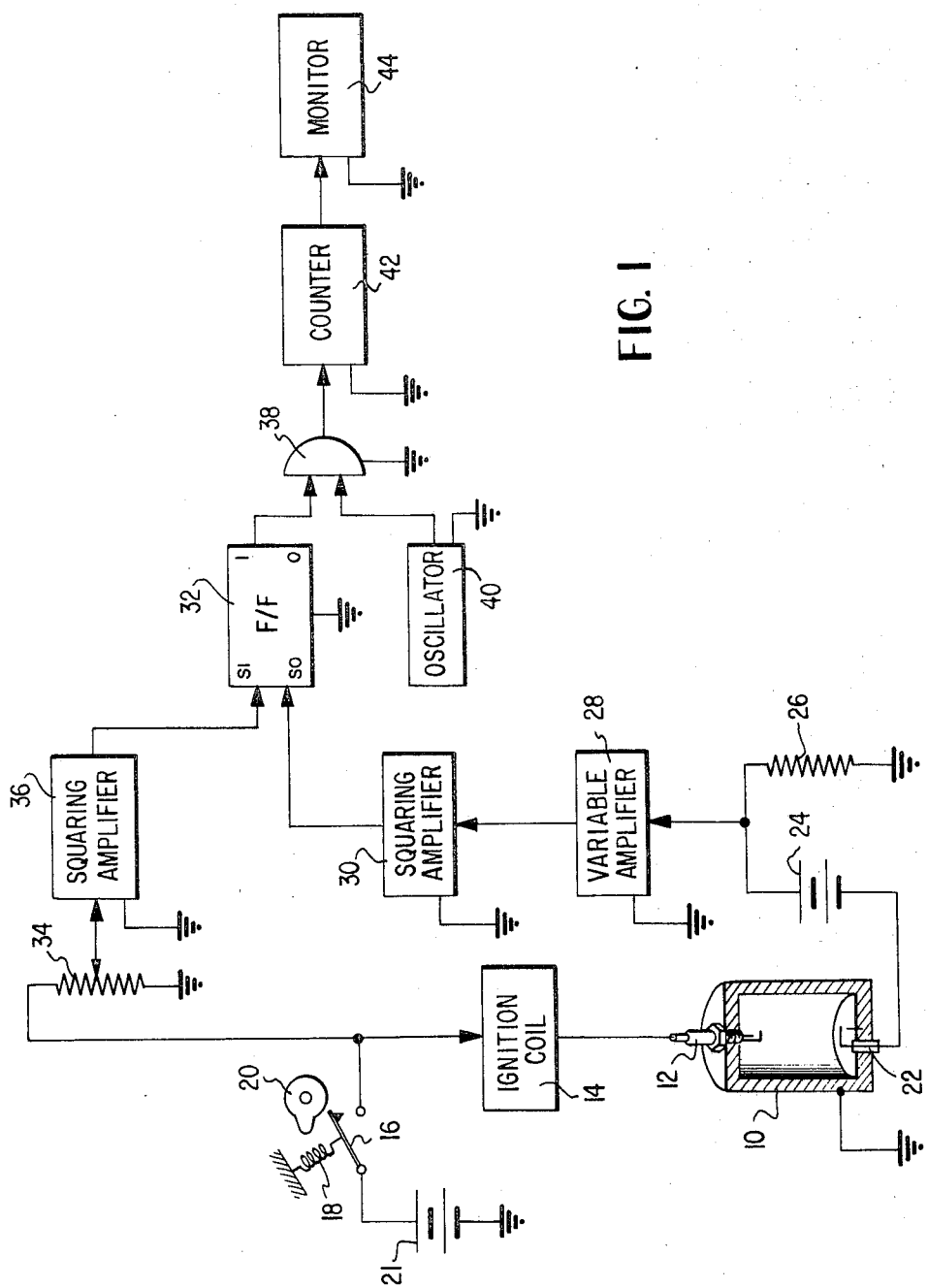

Development of new fuels, particularly fuels for use in internal combustion engines, requires means for evaluation of the fuel burning characteristics. The burning rate and other burning characteristics of a fuel such as gasoline vary considerably as the fuel additives or composition are varied. Efforts to reduce the amount of unburned hydrocarbons in fuel exhaust in order to reduce air pollution involve considerable study of fuel burning characteristics. Optimum engine performance requires use of a fuel having proper burning characteristics to avoid ignition of the fuel at an improper time and to insure against misfiring.

The present invention is an apparatus for measuring the burning rate and combustion characteristics of internal combustion engine fuels. The electrical signal which causes a spark to ignite the fuel within a combustion chamber is also applied through amplifying means to set a flip flop. The set output of the flip flop gates an oscillator. When the flame reaches the far side of the combustion chamber, a signal crosses an ionization gap to reset the flip flop and close the gate. The pulses from the oscillator are counted during the time the flop flop is set. This count provides an indication of the time required for the flame to cross the combustion chamber. Thus the count indicates the fuel burning rate. A misfire is indicated by an abnormally large count. In one embodiment of the invention, the oscillator pulses are applied to a linear counter which provides a discrete output for each time interval and so over a large number of tests the burning rates are automatically divided into groups by burning rate. As a result a statistical breakdown of the burning rates is readily available for further analysis. The effect of the ionization gap signal can be varied to study burning characteristics of fuels.

These and other aspects and advantages of the present invention will be more apparent from the following detailed description and claims, particularly when read in conjunction with the accompanying drawings in which like parts bear like reference numerals.

Figure 2:
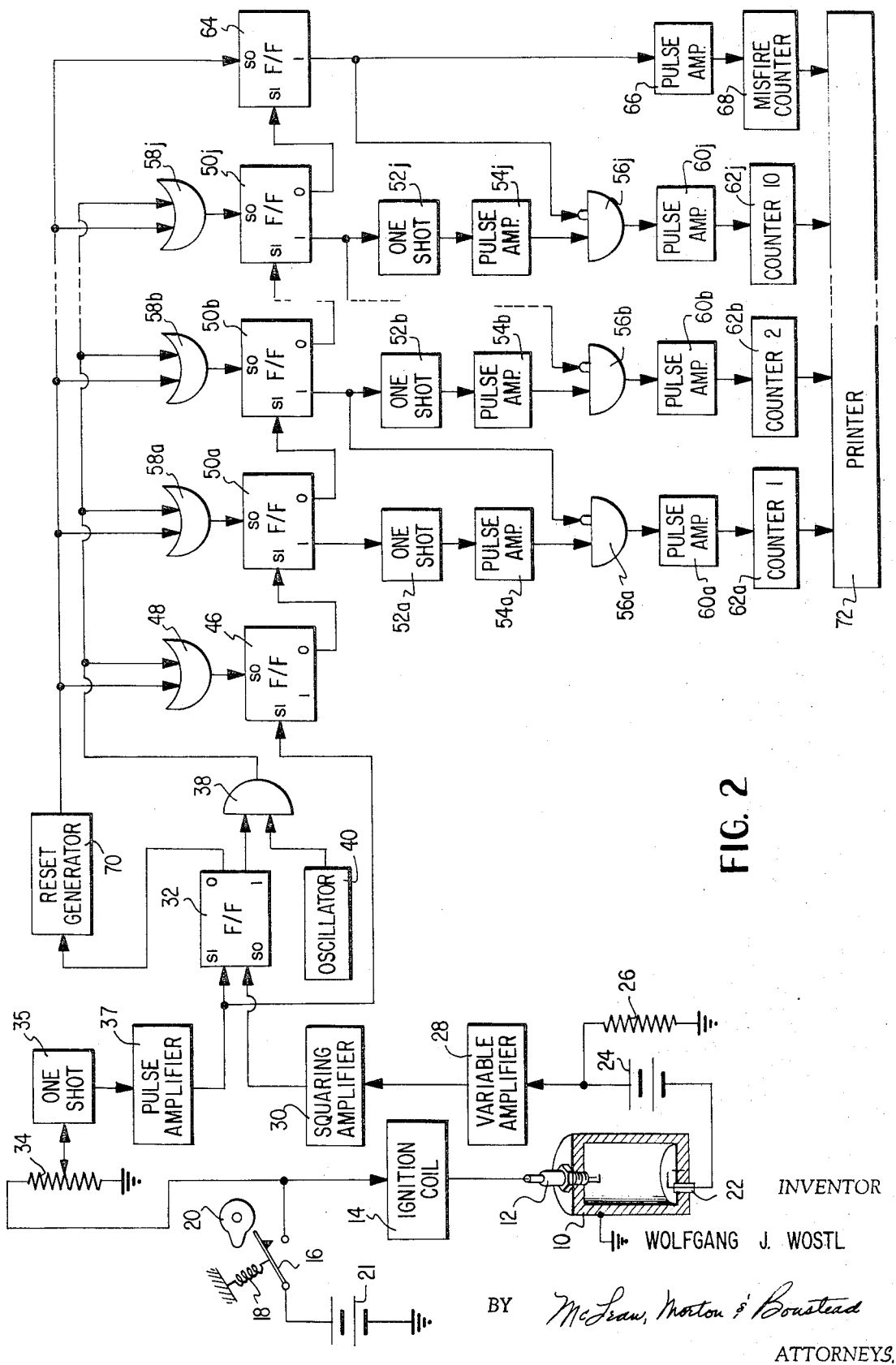

In the drawing:
FIG. 1 is a block diagram of the present invention; and
FIG. 2 is a block diagram of another embodiment of the present invention.

In FIG. 1 combustion chamber 10 includes means such as a spark plug 12 for igniting fuel contained within the combustion chamber. Spark plug 12 is coupled through ignition coil 14 to a switching means, which is depicted in FIG. 1 as comprising switch 16. Spring 18 is coupled between the moving contact of switch 16 and a fixed retainer so that switch 16 is normally held open. Cam 20 is caused to rotate by means such as an electric motor (not shown) so that switch 16 is closed once each time cam 20 rotates. When switch 16 is closed a voltage source such as battery 21 is connected through switch 16 to the input of ignition coil 14. The wall of combustion chamber 10 is connected to the ground reference of battery 21. As a consequence, when switch 16 is closed a voltage pulse is applied from coil 14 to spark plug 12, igniting the fuel within combustion chamber 10. Cam 20 and switch 16 provide the function of the points in an automobile distributor which could be utilized in the present invention.

Ionization gap 22 is located within chamber 10 opposite spark plug 12. One side of ionization gap 22 is connected to the wall of combustion chamber 10, and thus it is connected to ground. The output of ionization gap 22 is insulated from the wall of combustion chamber 10 and is tied to one side of battery 24 which has its other side coupled to ground through resistor 26. The junction of battery 24 and resistor 26 is connected to the input of variable amplifier 28. The output of amplifier 28 is applied through squaring amplifier 30 to the set zero input of bistable multivibrator or flip flop 32.

When switch 16 is closed voltage from battery 21 is also applied across potentiometer 34 to ground. The arm of potentiometer 34 is coupled through squaring amplifier 36 to the set one input of flip flop 32.

Squaring amplifiers 30 and 36 might be Schmitt triggers, by way of example. Thus when the voltage applied to their input is of at least a preset minimum level, the squaring amplifiers provide a squared output signal to trigger flip flop 32.

Each time cam 20 rotates to close switch 16 squaring amplifier 36 applies a pulse which sets flip flop 32 its one condition. Simultaneously, the pulse from coil 14 causes spark plug 12 to ignite the fuel within combustion chamber 10. When the fuel flame front reaches ionization gap 22, an electrical path is provided through gap 22 to couple battery 24 to ground. Current then flows through resistor 26, which in turn causes a voltage pulse to be fed to variable amplifier 28. Variable amplifier 28 applies a pulse through squaring amplifier 30 to return flip flop 32 to its zero condition. Therefore, during the time required for the flame to cross combustion chamber 10, flip flop 32 is in its one condition.

The one output of flip flop 32 is connected to an input of AND gate 38. Oscillator 40, which by way of example might be a free running multivibrator operating at 10 kilohertz, has its output connected to the other input of gate 38. Consequently, during the time that flip flop 32 is in its one condition, pulses from oscillator 40 pass through gate 38 to counter 42. When the flame reaching ionization gap 22 causes a pulse to return flip flop 32 to its zero condition, the count on counter 42 is indicative of the time which has been required for the flame to cross combustion chamber 10. The count on counter 42 is then read by monitor 44, which, for example, might be a digital printer or a digital display.

From experience the time required for the flame to cross combustion chamber 10 can be approximated. For example, burning times between 2.0 and 3.0 milliseconds might be experienced. If oscillator 40 provides a 10 kilohertz output, then a time of 2.0 milliseconds is indicated by a reading of 20 counts on counter 42. Likewise a time of 3.0 milliseconds is indicated by 30 counts. Therefore, the output of counter 42 indicates the burning time within one-tenth of a millisecond. If no misfirings occur, counter 42 reaches a level between 20 and 30, before flip flop 32 returns to its zero condition. Such a reading indicates a burning time between 2.0 and 3.0 milliseconds. If a misfiring occurs no pulse is applied to return flip flop 32 to its zero condition until the next firing occurs. Since pulses from oscillator 40 pass AND gate 38 all the time flip flop 32 is in its one condition, a misfire results in more than 30 pulses being applied to counter 42. Since the fuel burning time and the engine cycle time both elapse between consecutive pulses, a misfiring is indicated by a reading in the order of 350 on monitor 44.

Counts of burning time can be obtained as rapidly as fuel can be fed to and exhaust removed from chamber 10. If monitor 44 is a digital printer, then it may not be able to print readings as rapidly as they are available. In such a case, counter 42 holds a reading until it has been printed by monitor 44, at which time monitor 44 resets counter 42 and enables it to start another count. Burning time signals are not counted in the interim. Since the apparatus provides output signals at a relatively high rate, significant data can be obtained in a short period of time from those ignition times which are printed.

By way of example, one burning rate monitor in accordance with the present invention has been utilized to obtain three printed output readings per second. A single cylinder two cycle engine running at 3600 revolutions per minute fires about 30 times per second. This example system records three firings per second or about every tenth firing. Over a period of only a few minutes, enough firings are recorded to enable an accurate evaluation of the fuel being utilized.

The gain of variable amplifier 28 can be adjusted to require a minimum ionization pulse amplitude to indicate that a firing has occurred. By this means the ionization characteristics of various fuels can be studied.

The embodiment of the invention depicted in FIG. 2 automatically divides the fuel burning times into discrete groups, so that over a large number of runs a statistical breakdown of burning times is obtained. The basic test apparatus is the same as that depicted in FIG. 1, and a counter suited to this statistical breakdown is utilized. Thus battery 21 is connected through switch 16 to ignition coil 14 which has its output tied to spark plug 12 within combustion chamber 10. Ionization gap 22 connects battery 24 to ground when the flame reaches the ionization gap. When that occurs a voltage pulse is developed across resistor 26 and is applied to variable amplifier 28. The output of amplifier 28 is coupled by squaring amplifier 30 to the set zero input of flip flop 32. Switch 16 also connects battery 20 to potentiometer 34 which has its arm tied to the input of monostable multivibrator or one shot 35. The output of one shot 35 is coupled through pulse amplifier 37 to the set one input of flip flop 32.

One shot 35 and amplifier 37 are utilized in this embodiment in place of squaring amplifier 36 found in the embodiment of FIG. 1. When cam 20 closes switch 16 to apply voltage to coil 14, the voltage drop across potentiometer 34 triggers one shot 35 to its unstable state. When one shot 35 returns to its stable state, the resulting pulse passes through amplifier 37 to set flip flop 32 to its one condition. One shot 35 and amplifier 37 are selected so that between the closing of switch 16 and the application of a pulse from amplifier 37 to the set one input of flip flop 32 there elapses a time slightly less than the lowest burning time expected. One shot 35 thus functions as a delay multivibrator. By way of example, one shot 35 and amplifier 37 might provide a delay of 2.0 milliseconds.

The output from pulse amplifier 37 is also applied to the set one input of flip flop 46. The one output of flip flop 32 enables AND gate 38 to pass pulses from oscillator 40. The first of these pulses from oscillator 40 goes through OR gate 48 to the set zero input of flip flop 46.

The zero output of flip flop 46 is capacitor coupled to the set one input of flip flop 50a. The one output of flip flop 50a triggers one shot 52a to its unstable state. When one shot 52a returns to its stable state it passes a pulse through pulse amplifier 54a to the signal input of INHIBITED-AND gate 56a. One shot 52a and amplifier 54a are selected so that a time of 0.1 millisecond elapses between the count indication provided by generation of the one output from flip flop 50a and the application of the count pulse by amplifier 54a to gate 56a.

The next pulse from oscillator 40 passes through AND gate 38 and through OR gate 58a to the set zero input of flip flop 50a. This returns flip flop 50a to its zero condition. The zero output of flip flop 50a is capacitor coupled to the set one input of flip flop 50b. Just as in the circuitry associated with flip flop 50a, the one output of flip flop 50b triggers one shot 52b to its unstable state, and, after a delay of 0.1 millisecond, one shot 52b applies a pulse through pulse amplifier 54b to the signal input of INHIBITED-AND gate 56b. The one output of flip flop 50b is also connected to the inhibit input of INHIBITED-AND gate 56a.

When switch 16 closes to cause spark plug 12 to ignite the fuel within combustion chamber 10, one shot 35 and amplifier 37 introduce, for example, a 2.0 millisecond delay before causing flip flop 32 to turn on gate 38 to allow pulses from oscillator 40 to pass. Pulse amplifier 37 also sets flip flop 46 to its one condition to start the counting circuitry. The next pulse from oscillator 40 returns flip flop 46 to its zero condition, and the flip flop 46 zero output sets flip flop 50a to its one condition. After a delay of 0.1 millisecond one shot 52a and pulse amplifier 54a apply a brief count pulse to gate 56a. At this time, oscillator 40 generates another pulse. If the flame has not reached ionization gap 22, flip flop 32 is still in its one condition, and this pulse from oscillator 40 passes through gates 38 and 58a to return flip flop 50a to its zero condition. The zero output from flip flop 50a sets flip flop 50b to its one condition, and the one output from flip flop 50b blocks gate 56a so that the pulse amplifier 54a output cannot be passed. Should the flame reach ionization gap 22 in a time between 2.0 and 2.1 milliseconds, then flip flop 50b is not set to its one condition. In such a case the output of amplifier 54a passes through gate 56a and pulse amplifier 60a to counter 62a. The count pulse from amplifier 54a is preferably shorter than the 0.1 millisecond interval between output pulses from oscillator 40 to insure that the count pulse will not be passed by gate 56a after flip flop 50b returns to its zero condition.

Ten similar sets of components 50–62 are provided. These are designated by subscripts $a$–$j$ for the ten 0.1 millisecond divisions of the time range in which the firing time is expected to fall, for example the time between 2.1 and 3.0 milliseconds. Multivibrators 46, and 50a–50j are thus connected as a linear counter, and the components 52–62 associated with each multivibrator 50a–50j comprise a digit circuit for each of these millisecond divisions. The particular digit circuit which applies a pulse to its associated counter 62a–62j is determined by the time which elapses between the ignition of the fuel within combustion chamber 10 and the closing of ionization gap 22. By way of example, if the flame reaches ionization gap 22 2.34 milliseconds after switch 16 has closed, a count is registered by counter 62c.

An additional flip flop 64 is provided with its set one input capacitor coupled to the zero output of flip flop 50j. The set zero input of flip flop 64 is not connected to the output of AND gate 38. Consequently, pulses from oscillator 40 do not reach flip flop 64. If the flame within combustion chamber 10 has not reached ionization gap 22 within the expected time, for example between 2.0 and 3.0 milliseconds, a pulse from oscillator 40 returns flip flop 50j to its zero condition, and this zero output sets flip flop 64 to its one condition. The flip flop 64 one output blocks INHIBITED-AND gate 56j and passes through pulse amplifier 66 to counter 68. The reading of counter 68 thus indicates the number of times there has been a misfire within combustion chamber 10. Should the fuel within chamber 10 be changed to one for which the expected burning time is greater than 3.0 milliseconds or less than 2.1 milliseconds, the timing circuitry within delay one shot 35 can be adjusted accordingly.

When flip flop 32 returns to its zero condition, its zero output is applied to reset generator 70 which passes a signal through OR gate 48 and through each OR gate 58a–58j, to the set zero input of flip flop 46 and flip flops 50a–50j, and to the set zero input of flip flop 64. The counting circuitry is thus reset and is ready to time the next burning rate. By way of example reset generator 70 could be a one-shot multivibrator. Counters 62a–62j and 68 can be connected to a printer 72 to periodically provide a written indication of the firing rate statistical breakdown.

Although the invention has been described with reference to preferred embodiments, it is apparent that numerous alterations and substitutions might be made without parrting from the scope of the invention. By design optimization, certain components might be omitted from the circuitry which is depicted in the drawings in detail in the interests of clarity. It may be found that isolating diodes or amplifiers are desirable at particular locations. Such modifications are felt to be within the skill of the art. Thus, the scope of the invention is defined by the appended claims.

What is claimed is:

1. Apparatus for determining burning characteristics of fuels comprising:
   (A) a combustion chamber adapted to receive a fuel;
   (B) means for igniting fuel within said combustion chamber;
   (C) means for generating a signal when a flame front has reached a known point within said combustion chamber;
   (D) an oscillator for generating pulses;
   (E) a pulse counter having an input and including:
      (i) a plurality of bistable multivibrators connected together to form a linear counter having a starting bistable multivibrator and counting bistable multivibrators which provide count indication outputs;
      (ii) means to set each counting bistable multivibrator to a noncount indicating condition prior to ignition of fuel in said combustion chamber;
      (iii) a plurality of digit circuits, each digit circuit uniquely associated with a counting bistable multivibrator and comprising:
         (a) a time delay means copuled to the associated counting bistable multivibrator for generating a count pulse a preset time after generation of a count indicating output by that associated counting bistable multivibrator, said preset time being equal to the time between consecutive pulses from said oscillator, each said count pulse having a time duration no greater than the time between consecutive oscillator pulses;
         (b) a gating circuit having a signal input, an inhibiting input, and an output, said signal input being electrically connected to said output when no input indication is applied to said inhibiting input, said signal input being electrically isolated from said output when an input indication is applied to said inhibiting input, said inhibiting input coupled to the count indication output of the next succeeding counting bistable multivibrator in said linear counter, said signal input coupled to said time delay means to pass said count pulse to said gating circuit output in the absence of a count indication output from said next succeeding counting bistable multivibrator; and
         (c) counting means coupled to said gating circuit output to indicate a totalized count of the count pulses passed by said gating circuit;
   (F) gating means capable of assuming a first state in which said oscillator pulses are applied to said pulse counter input and capable of assuming a second state in which said oscillator pulses are blocked from said pulse counter input; and
   (G) switching means for causing said gating means to assume said first state upon ignition of fuel within said combustion chamber and to assume said second state upon generation of said signal, said switching means including:
      (i) a further bistable multivibrator coupled to said gating means and capable of assuming a first condition in which said gating means is caused to assume its first state and capable of assuming a second condition in which said gating means is caused to assume its second state, said further bistable multivibrator assuming its first condition upon ignition of fuel within said combustion chamber and assuming its second condition upon generation of said signal; and
      (ii) means to time a preset delay between the ignition of fuel within said combustion chamber and the assumption by said further bistable multivibrator of its first condition.

2. Apparatus as claimed in claim 1 in which each said time delay means comprises a monostable multivibrator.

3. Apparatus as claimed in claim 2 further comprising further means for indicating a misfire within said combustion chamber.

4. Apparatus as claimed in claim 3 in which said further means includes a bistable multivibrator coupled to said linear counter.

5. Apparatus as claimed in claim 4 further comprising means for printing an indication of said counting means indications.

6. Apparatus for determining burning characteristics of fuels comprising:
   (A) a combustion chamber adapted to receive a fuel;
   (B) means for igniting fuel within said combustion chamber;
   (C) means for generating a signal when a flame front has reached a known point within said combustion chamber;
   (D) an oscillator for generating pulses;
   (E) a pulse counter having an input and including:
      (i) a plurality of bistable multivibrators connected together to form a linear counter having a starting bistable multivibrator and counting bistable multivibrators which provide count indication outputs;
      (ii) means to set each counting bistable multivibrator to a noncount indicating condition prior to ignition of fuel in said combustion chamber;
      (iii) a plurality of digit circuits, each digit circuit uniquely associated with a counting bistable multivibrator and comprising:
         (a) a time delay means coupled to the associated counting bistable multivibrator for generating a count pulse a preset time after generation of a count indicating output by that associated counting bistable multivibrator, said preset time being equal to the time between consecutive pulses from said oscillator, each said count pulse having a time duration no greater than the time between consecutive oscillator pulses;
         (b) a gating circuit having a signal input, an inhibiting input, and an output, said signal input being electrically connected to said output when no input indication is applied to said inhibiting input, said signal input being electrically isolated from said output when an input indication is applied to said inhibiting input, said inhibiting input coupled to the count indication output of the next succeeding counting bistable multivibrator in said linear counter, said signal input coupled to said time delay means to pass said count pulse to said gating circuit output in the absence of a count indication output from said next succeeding counting bistable multivibrator; and (c) counting means coupled to said gating circuit output to indicate a totalized count of the count pulses passed by said gating circuit;

(F) gating means capable of assuming a first state in which said oscillator pulses are applied to said pulse counter input and capable of assuming a second state in which said oscillator pulses are blocked from said pulse counter input; and (G) switching means for causing said gating means to assume said first state upon ignition of fuel within said combustion chamber and to assume said second state upon generation of said signal.

7. Apparatus as claimed in claim 6 in which said switching means further includes variable means for varying the minimum amplitude of said generated signal required to cause said bistable multivibrator to assume its second condition.

References Cited
UNITED STATES PATENTS

| | | | |
|---|---|---|---|
| 2,395,902 | 3/1946 | Nisewanger et al. | 73—35 XR |
| 2,543,141 | 2/1951 | Vichnievsky | 73—35 |
| 2,851,596 | 9/1958 | Hilton. | |
| 3,010,313 | 11/1961 | Weller | 73—35 XR |
| 3,126,733 | 3/1964 | Heigl et al. | 73—35 |

JAMES J. GILL, Primary Examiner